United States Patent Office

3,652,679
Patented Mar. 28, 1972

3,652,679
PHENOLIC PROCESS FOR PRODUCING SULFIDES
Edward F. Zaweski, Pleasant Ridge, Mich., assignor to
Ethyl Corporation, New York, N.Y.
No Drawing. Filed July 7, 1969, Ser. No. 839,715
Int. Cl. C07c 149/36
U.S. Cl. 260—609 F    10 Claims

ABSTRACT OF THE DISCLOSURE

A process for making $\alpha,\alpha'$-thiobiscresols by reacting $\alpha$-alkoxycresols with alkali metal or alkaline earth metal sulfides. For example, the reaction of $\alpha$-methoxy-2,6-di-tert-butyl-p-cresol with sodium sulfide yields $\alpha,\alpha'$-thiobis (2,6-di-tert-butyl-p-cresol). The products are useful antioxidants.

BACKGROUND $\alpha,\alpha'$-Thiobiscresols such as $\alpha,\alpha'$-thiobis(2,6-di-tert-butyl-p-cresol) are known compounds useful as antioxidants. Their use in this field is shown in U.S. 3,274,258. Methods of making these compounds are also known. For example, the above patent shows a process for making them by reacting the corresponding hydroxybenzyl halide with thiourea and chlorine, followed by reduction and further reaction with a hydroxybenzyl halide. In U.S. 3,065,275, another process is shown comprising the reaction of a hydroxybenzyl halide with an alkali metal sulfide. In U.S. 3,272,869, the compounds are made by reacting a phenol with an alkali metal sulfide and formaldehyde. Another process is shown in U.S. 3,260,756 comprising reacting a hydroxybenzyl dithiocarbamate with an alkali metal sulfide or hydrosulfide. Finally, in U.S. 3,281,473, a process is described comprising the reaction of a hydroxybenzyl benzothiazolyl sulfide with an alkali metal sulfide.

SUMMARY

An object of the present invention is to provide a particularly facile method for making $\alpha,\alpha'$-thiobiscresols. This method comprises reacting $\alpha$-alkoxycresols with alkali metal or alkaline earth metal sulfides.

DESCRIPTION OF THE PREFERRED EMBODIMENTS

A preferred embodiment of this invention is a process for making an $\alpha,\alpha'$-thiobiscresol, said process comprising reacting (A) an $\alpha$-alkoxycresol having the formula:

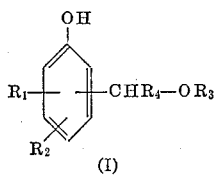

wherein $R_1$ and $R_2$ are selected from the group consisting of hydrogen, alkyl radicals containing 1–20 carbon atoms, cycloalkyl radicals containing 6–20 carbon atoms, aryl radicals containing 6-20 carbon atoms, and aralkyl radicals containing 7–20 carbon atoms, $R_3$ is an alkyl radical containing 1–20 carbon atoms, and $R_4$ is selected from the group consisting of hydrogen, alkyl radicals containing 1–12 carbon atoms, cycloalkyl radicals containing 6–12 carbon atoms, aryl radicals containing 6–20 carbon atoms and aralkyl radicals containing 7–20 carbon atoms, with (B) a metal sulfide selected from the group consisting of alkali metal sulfides and alkaline earth metal sulfides at a temperature of from about 50–250° C.

Examples of suitable $\alpha$-alkoxycresols having Formula I are:

$\alpha$-methoxy-p-cresol
$\alpha$-ethoxy-4-methyl-o-cresol
$\alpha$-n-butoxy-2-tert-butyl-p-cresol
$\alpha$-n-eicosyloxy-4-eicosyl-o-cresol
$\alpha$-sec-dodecoxy-2-cyclohexyl-6-methyl-p-cresol
$\alpha$-isobutoxy-4-(1-methylcyclohexyl)-o-cresol
$\alpha$-tert-pentoxy-4-cyclooctyl-o-cresol
$\alpha$-n-dodecoxy-4-(4-sec-dodecylcyclohexyl)-6-tert-butyl-o-cresol
$\alpha$-methoxy-2-phenyl-p-cresol
$\alpha$-methoxy-4-($\alpha$-naphthyl)-o-cresol
$\alpha$-n-butoxy-4-(2,4-di-sec-heptylphenyl)-o-cresol
$\alpha$-n-octyloxy-2-($\alpha$-methylbenzyl)-p-cresol
$\alpha$-methoxy-4-($\alpha,\alpha$-dimethyl-4-n-dodecylbenzyl)-o-cresol
$\alpha$-methoxy-$\alpha$-methyl-4,6-di-tert-butyl-o-cresol
$\alpha$-methoxy-$\alpha$-phenyl-6-($\alpha$-methylbenzyl)-o-cresol
$\alpha$-dodecoxy-$\alpha$-dodecyl-4-($\alpha$-methylbenzyl)-o-cresol
$\alpha$-methoxy-$\alpha$-cyclohexyl-4-methyl-6-cyclohexyl-o-cresol
$\alpha$-methoxy-$\alpha$-(4-n-hexyl-cyclohexyl)-2,6-di-tert-butyl-p-cresol
$\alpha$-dodecoxy-$\alpha$-(2,4-di-tert-butylphenyl)-2,6-di-($\alpha$-methylbenzyl)-p-cresol
$\alpha$-ethoxy-$\alpha$ (4-sec-dodecylphenyl)-2-methyl-6-sec-dodecyl-p-cresol
$\alpha$-methoxy-$\alpha$-benzyl-2,6-di-isopropyl-p-creol
$\alpha$-methoxy-$\alpha$-($\alpha$-methylbenzyl)-2,6-di-tert-butyl-p-cresol
$\alpha$-n-butoxy-$\alpha$-($\alpha$-methyl-4-n-dodecyl-benzyl)-p-cresol
$\alpha$-n-decoxy-$\alpha$-n-hexyl-2,6-di-tert-butyl-p-cresol In a more preferred embodiment, the $\alpha$-alkoxycresols have at least one alpha-branched hydrocarbon group ortho to the phenolic hydroxyl radical. In other words, a more preferred embodiment is a process for making $\alpha,\alpha'$-thiobiscresols comprising reacting (A) an $\alpha$-alkoxycresol having the formula:

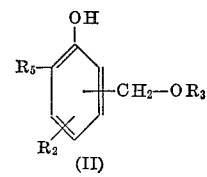

wherein $R_2$ and $R_3$ are the same as in Formula I, and $R_5$ is selected from the group consisting of alpha-branched alkyl radicals containing 3–20 carbon atoms, cycloalkyl radicals containing 6–20 carbon atoms and alpha-branched aralkyl radicals containing 8–20 carbon atoms, with (B) a metal sulfide selected from the group consisting of alkali metal sulfides and alkaline earth metal sulfides at a temperature of from about 50–250° C.

Examples of $\alpha$-alkoxycresol reactants having Formula II are:

$\alpha$-methoxy-2,6-diisopropyl-p-cresol
$\alpha$-ethoxy-2-tert-butyl-p-cresol
$\alpha$-methoxy-4-methyl-6-tert-butyl-o-cresol
$\alpha$-n-decoxy-4,6-di-tert-butyl-o-cresol
$\alpha$-n-butoxy-2-tert-eicosyl-p-cresol
$\alpha$-methoxy-2,6-di-sec-octyl-p-cresol
$\alpha$-methoxy-2-cyclohexyl-p-cresol
$\alpha$-sec-dodecyloxy-4-(2,4-di-sec-heptylcyclohexyl)-6-methyl-p-cresol
$\alpha$-methoxy-2,6-dicyclooctyl-p-cresol
$\alpha$-methoxy-2,6-di-($\alpha$-methylbenzyl)-p-cresol
$\alpha$-eicosyloxy-2-($\alpha,\alpha$-dimethylbenzyl)-6-tert-butyl-p-cresol
$\alpha$-methoxy-4,6-di-($\alpha,\alpha$-dimethylbenzyl)-o-cresol
$\alpha$-isopropoxy-2-($\alpha$-methyl-4-dodecylbenzyl)-6-methyl-p-cresol The most preferred α-alkoxycresol reactants are α-methoxy-2-methyl-6-tert-butyl-p-cresol and α-methoxy-2,6-di-tert-butyl)-p-cresol.

Methods for making the above α-alkoxycresols are known. One such method is shown in U.S. 2,838,571. This method comprises the reaction of a phenol with formaldehyde in a monohydric alcohol using a metal hydroxide catalyst. Another method is to react the corresponding hydroxybenzyl halide such as those shown in U.S. 3,257,321 with an alcohol. A most facile method of conducting the process is to prepare the α-alkoxycresol in an alcohol solvent, preferably methanol, by the first of the above procedures and then, without recovering the α-alkoxycresol, to mix it with an alkali or alkaline earth metal sulfide and heat the mixture to a reaction temperature.

Useful metal sulfides include the alkali metal sulfide and alkaline earth metal sulfides such as lithium sulfide, sodium sulfide, potassium sulfide, rubidium sulfide, cesium sulfide, beryllium sulfide, magnesium sulfide, calcium sulfide, strontium sulfide, and barium, sulfide. These may be anhydrous or in the form of their hydrate. Good results are also obtained employing the corresponding metal hydrosulfides which are equivalent in the process. The most preferred metal sulfide is sodium sulfide.

The process can be carried out by merely mixing the α-alkoxycresol and metal sulfide together and heating them to reaction temperature. Generally, from about 0.5 to 3 moles of α-alkoxycresol are used for each mole of metal sulfide. A preferred range is from about 1 to 2 moles of α-alkoxycresol per mole of metal sulfide.

The reaction can be carried out with or without a solvent. It is generally preferred to use a solvent as the reaction proceeds more readily. Preferred solvents are the lower alkanols, especially those containing from 1 to 6 carbon atoms such as methanol, ethanol, n-propanol, isopropanol, n-butanol, isobutanol, sec-butanol, tert-butanol, n-pentanol, isoamyl alcohol, n-hexanol, 2-ethyl-n-butanol, and the like. The most preferred solvents are the primary lower alkanols, and the most preferred solvent is methanol. Although anhydrous solvents are generally used, the reaction proceeds readily when the solvent contains water, and in fact, in some cases water is beneficial. In general, the solvents can contain up to about 20 percent water.

The amount of solvent should be sufficient to dissolve at least part of the reactants. Good results are obtained with about 0.5–20 parts of solvent per part of α-alkoxycresol. A preferred amount is from about 2–6 parts of solvent per part of α-alkoxycresol reactant.

The temperature should be high enough to cause the reaction to proceed at a reasonable rate, but not so high as to cause decomposition of the reactants or products. A useful range is from about 50–250° C. A most preferred temperature range is from about 75–200° C.

Although not required, the process is preferably carried out under an inert atmosphere such as nitrogen. This results in a lighter colored product.

The reaction is best carried out at atmospheric pressure, although when desired, it can be carried out at higher or lower pressures. In general, it can be conducted at pressures up to about 1000 p.s.i.g. The higher pressures are generally employed to obtain higher reaction temperatures when using an alcohol solvent, which normally would distill at these higher temperatures.

The reaction is conducted for a period sufficient to give a satisfactory yield. This depends somewhat on temperature and the specific reactants used. Generally, good yields are obtained in 30 minutes to 4 hours.

The following examples serve to illustrate the manner in which the process is conducted. All parts are by weight unless otherwise specified.

EXAMPLE 1

In a reaction vessel equipped with stirrer, thermometer, condenser, heating means and provided with a nitrogen atmosphere was placed 125.2 parts of α-methoxy-2,6-di-tert-butyl-p-cresol and 395 parts of methanol. While stirring, 60 parts of sodium sulfide nonahydrate was added over a 5-minute period. The mixture turned purple. It was heated and refluxed for 30 minutes, following which it was cooled and diluted with an additional 40 parts of methanol. It was cooled to 0° C. and the precipitate which formed removed by filtration. It was analyzed by gas chromatography as α,α'-thiobis(2,6-di-tert-butyl-p-cresol), which was obtained in good yield.

EXAMPLE 2

In this example, α-methoxy-2,6-di-tert-butyl-p-cresol is first prepared following the general procedure in U.S. 2,838,571 and then converted to α,α'-thiobis(2,6-di-tert-butyl-p-cresol).

In reaction vessel as used in Example 1 is placed 206 parts of 2,6-di-tert-butylphenol, 50 parts of 95 percent paraformaldehyde, 600 parts of methanol and 10 parts of potassium hydroxide. The reaction mixture is stirred for four hours at 40–50° C., at which time gas chromatography indicates substantial conversion of the 2,6-di-tert-butylphenol to α-methoxy-2,6-di-tert-butyl-p-cresol. At this time, 150 parts of sodium sulfide nonahydrate is added and the mixture stirred at reflux for one hour. It is then cooled to 0° C. and the product filtered off. The product is recrystallized from hexanes, yielding α,α'-thiobis(2,6-di-tert-butyl-p-cresol) in good yield and purity.

EXAMPLE 3

In the reaction vessel of Example 1 place 346 parts of 4-methyl-6-tert-butyl-α-dodecoxy-o-cresol and 1000 parts of azeotropic isopropanol. Add 42 parts of calcium sulfide and reflux for 4 hours. Add 50 parts of water and cool to 0° C. Filter and dissolve the precipitate with hot ethanol and filter while hot. Cool the filtrate to crystallize α,α'-thiobis(4-methyl-6-tert-butyl-o-cresol).

Other alkaline earth sulfides can be used in the above example such as magnesium sulfide, barium sulfide, strontium sulfide, and the like, with good results.

EXAMPLE 4

In the reaction vessel of Example 1 place 330 parts of α-methoxy-2,6-di(α-methylbenzyl)-p-cresol. Add 1000 parts of tert-butanol and 125 parts of potassium sulfide pentahydrate. Stir and heat to 80–100° C. Stir at this temperature for 2 hours and then add 200 parts of water and cool to 30° C., causing the product to precipitate. Filter off the product and recrystallize from hexane to give α,α'-thiobis[2,6-di(α-methylbenzyl)-p-cresol] in good yield.

Following the above general procedure, other α-alkoxy cresols can be used with good results. For example, α-sec-eicosyloxy-2,6-di-tert-butyl-p-cresol yields α,α'-thiobis(2,6-di-tert-butyl-p-cresol). Likewise, α-methoxy-2-methyl-6-tert-butyl-p-cresol yields α,α'-thiobis(2-methyl-6-tert-butyl-p-cresol) in good yield. Also, α-ethoxy-2,6-dicyclohexyl-p-cresol forms α,α'-thiobis(2,6-dicyclohexyl-p-cresol). Similarly, α-methoxy-4,6-di-tert-butyl-o-cresol yields α,α'-thiobis(4,6-di-tert-butyl-o-cresol). In like manner, α-n-dodecoxy-4-methyl-6-(α,α-dimethylbenzyl)-o-cresol yields α,α'-thiobis[4-methyl-6-(α,α-dimethylbenzyl)-o-cresol]. Use of α-isobutoxy-4-methyl-6-tert-butyl-o-cresol leads to α,α'-thiobis(4-methyl-6-tert-butyl-o-cresol). Likewise, α-methoxy-4-phenyl-o-cresol yields α,α'-thiobis(4-phenyl-o-cresol). In like manner, α-methoxy-o-cresol yields α,α'-thiobis-o-cresol. Also, α-methoxy-2-tert-butyl-5-methyl-p-cresol yields α,α'-thiobis(2-tert-butyl-5-methyl-p-cresol). Likewise, α-methoxy-3-methyl-6-tert-butyl-o-cresol yields α,α'-thiobis(3-methyl-6-tert-butyl-o-cresol).

EXAMPLE 5

In a reaction vessel as used in Example 1 place 250 parts of α-methoxy-2,6-di-tert-butyl-p-cresol and 40 parts of finely-ground sodium sulfide nonahydrate. Heat the mixture to 110° C. until liquid and then stir at 110–120° C. for 6 hours. Pour into warm isooctane and filter hot. Cool the filtrate to recover α,α'-thiobis(2,6-di-tert-butylphenol).

EXAMPLE 6

In the reaction vessel of Example 1 place 138 parts of α-methoxy-p-cresol and 300 parts of ethanol. Heat the mixture to 50–60° C. and stir until dissolved. Add 25 parts of lithium sulfide and stir for one hour at 70–80° C. Cool to 0° C. and filter off the precipitate. Recrystallize the precipitate from isooctane to recover α,α'-thiobis-p-cresol.

Following the above procedure, any of the α-alkoxy cresols previously listed can be converted to their corresponding α,α'-thiobis cresol derivative.

As mentioned earlier, the α,α'-thiobis cresols made by this process are useful antioxidants. Generally from about 0.3–1 weight percent of the compound is incorporated in the material to be protected. They are especially useful as stabilizers and antioxidants for synthetic rubber. Stabilizers protect the polymer from chain scission and cross-linking during the time from initial polymerization up to compounding and vulcanization. Antioxidants are added during compounding and protect the final product after vulcanization.

The following examples show how to use certain compounds made by this process as stabilizers and antioxidants in rubbery polymers and copolymers.

EXAMPLE 7

Poly-cis-butadiene having greater than 90 percent of the cis configuration is prepared in a toluene solvent using as the catalyst diethyl aluminum chloride and titanium tetrachloride. To the solution is then added sufficient α,α'-thiobis(2,6-di-tert-butyl-p-cresol) to provide 1 p.p.h. based on polymer. The solution is then run into boiling water, causing the toluene to co-distill with the water and leaving a stabilized poly-cis-butadiene crumb which is dried and baled. This crumb is exceptionally stable during storage and does not exhibit any substantial change in Mooney viscosity or gel content.

EXAMPLE 8

To a SBR master batch containing 100 parts of styrene-butadiene copolymer, 2 parts zinc propionate stearate, 50 parts carbon black, 5 parts tar, 2 parts sulfur and 1.5 parts mercaptobenzothiazole is added 1.5 parts of α,α'-thiobis (2-methyl-6-tert-butyl-p-cresol). The mixture is masticated on a Banbury mixer, formed, and finally vulcanized for 60 minutes at 45 p.s.i.g. steam temperature. The resultant product is an exceptionally stable vulcanized SBR rubber.

What is claimed is:

1. A process for making an α,α'-thiobiscresol, said process comprising reacting (A) an α-alkoxycresol having the formula:

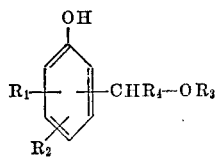

wherein $R_1$ and $R_2$ are selected from the group consisting of hydrogen, alkyl radicals containing 1–20 carbon atoms, cycloalkyl radicals containing 6–20 carbon atoms, aryl radicals containing 6–20 carbon atoms, and aralkyl radicals containing 7–20 carbon atoms, $R_3$ is an alkyl radical containing 1–20 carbon atoms, and $R_4$ is selected from the group consisting of hydrogen, alkyl radicals containing 1–12 carbon atoms, cycloalkyl radicals containing 6–12 carbon atoms, aryl radicals containing 6–20 carbon atoms, and aralkyl radicals containing 7–20 carbon atoms, wherein said —$CHR_4$—$OR_3$ group is ortho or para to the phenolic hydroxyl group, with (B) a metal sulfide selected from the group consisting of alkali metal sulfides and alkaline earth metal sulfides at a temperature of from about 50–250° C.

2. A process of claim 1 wherein said metal sulfide is an alkali metal sulfide.

3. A process of claim 2 carried out in a lower alkanol solvent.

4. A process of claim 1 wherein said α-alkoxycresol has the formula:

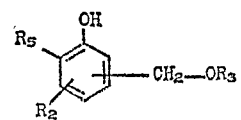

wherein $R_2$ and $R_3$ are the same as in claim 1, and $R_5$ is selected from the group consisting of alpha-branched alkyl radicals containing 3–20 carbon atoms, cycloalkyl radicals containing 6–20 carbon atoms, and alpha-branched aralkyl radicals containing 8–20 carbon atoms.

5. A process of claim 4 wherein said metal sulfide is an alkali metal sulfide.

6. A process of claim 5 carried out in a lower alkanol solvent.

7. A process of claim 6 wherein said solvent is methanol.

8. A process of claim 7 wherein said alkali metal sulfide is sodium sulfide.

9. A process of claim 8 wherein said α-alkoxycresol is α-methoxy-2,6-di-tert-butyl-p-cresol.

10. A process of claim 8 wherein said α-alkoxycresol is α-methoxy-2-methyl-6-tert-butyl-p-cresol.

References Cited

UNITED STATES PATENTS 3,489,804   1/1970   O'Shea _____ 260—609

ALEX MAZEL, Primary Examiner

D. R. PHILLIPS, Assistant Examiner

U.S. Cl. X.R.

260—45.95